(12) United States Patent
Asano et al.

(10) Patent No.: US 11,657,772 B2
(45) Date of Patent: May 23, 2023

(54) METHODS FOR DRIVING ELECTRO-OPTIC DISPLAYS

(71) Applicant: E INK CORPORATION, Billerica, MA (US)

(72) Inventors: Yuta Asano, White Plains, NY (US); Kenneth R. Crounse, Somerville, MA (US)

(73) Assignee: E Ink Corporation, Billerica, MA (US)

( * ) Notice: Subject to any disclaimer, the term of this patent is extended or adjusted under 35 U.S.C. 154(b) by 0 days.

(21) Appl. No.: 17/543,946

(22) Filed: Dec. 7, 2021

(65) Prior Publication Data

US 2022/0180824 A1  Jun. 9, 2022

Related U.S. Application Data

(60) Provisional application No. 63/122,936, filed on Dec. 8, 2020.

(51) Int. Cl.
| | | |
|---|---|---|
| G09G 3/34 | (2006.01) | |
| G09G 3/20 | (2006.01) | |
| G02F 1/167 | (2019.01) | |
| G02F 1/1677 | (2019.01) | |
| G02F 1/16757 | (2019.01) | |
| G02F 1/1335 | (2006.01) | |
| G02F 1/1675 | (2019.01) | |

(52) U.S. Cl.
CPC ....... *G09G 3/344* (2013.01); *G02F 1/133514* (2013.01); *G02F 1/167* (2013.01); *G02F 1/1677* (2019.01); *G02F 1/16757* (2019.01); *G09G 3/2003* (2013.01); *G02F 2001/1678* (2013.01); *G09G 2320/0257* (2013.01); *G09G 2360/16* (2013.01)

(58) Field of Classification Search
CPC .. G09G 3/344; G09G 3/2003; G02F 1/16757; G02F 1/1677; G02F 1/133514; G02F 1/167
USPC ......................................... 345/428, 589, 604
See application file for complete search history.

(56) References Cited

U.S. PATENT DOCUMENTS

| | | |
|---|---|---|
| 4,418,346 A | 11/1983 | Batchelder |
| 5,760,761 A | 6/1998 | Sheridon |
| 5,777,782 A | 7/1998 | Sheridon |
| 5,808,783 A | 9/1998 | Crowley |
| 5,872,552 A | 2/1999 | Gordon, II et al. |
| 5,930,026 A | 7/1999 | Jacobson et al. |
| 6,054,071 A | 4/2000 | Mikkelsen, Jr. |
| 6,055,091 A | 4/2000 | Sheridon et al. |

(Continued)

OTHER PUBLICATIONS

O'Regan, B. et al., "A Low Cost, High-efficiency Solar Cell Based on Dye-sensitized colloidal TiO2 Films", Nature, vol. 353, pp. 737-740 (Oct. 24, 1991).

(Continued)

*Primary Examiner* — Prabodh M Dharia
(74) *Attorney, Agent, or Firm* — Rajesh Vallabh

(57) ABSTRACT

There are provided methods for driving an electro-optic display having a plurality of display pixels, a such method includes receiving an image, converting the image into a YCbCr image; and processing the YCbCr image to generate a luma image. The method further includes calculating variations in a local area for the YCbCr image to obtain a variation map, and calculating an effect ratio map using the calculated variation.

13 Claims, 7 Drawing Sheets

(56) References Cited

U.S. PATENT DOCUMENTS

| | | |
|---|---|---|
| 6,097,531 A | 8/2000 | Sheridon |
| 6,128,124 A | 10/2000 | Silverman |
| 6,130,774 A | 10/2000 | Albert et al. |
| 6,137,467 A | 10/2000 | Sheridon et al. |
| 6,144,361 A | 11/2000 | Gordon, II et al. |
| 6,147,791 A | 11/2000 | Sheridon |
| 6,184,856 B1 | 2/2001 | Gordon, II et al. |
| 6,225,971 B1 | 5/2001 | Gordon, II et al. |
| 6,241,921 B1 | 6/2001 | Jacobson et al. |
| 6,271,823 B1 | 8/2001 | Gordon, II et al. |
| 6,301,038 B1 | 10/2001 | Fitzmaurice et al. |
| 6,445,489 B1 | 9/2002 | Jacobson et al. |
| 6,504,524 B1 | 1/2003 | Gates et al. |
| 6,512,354 B2 | 1/2003 | Jacobson et al. |
| 6,531,997 B1 | 3/2003 | Gates et al. |
| 6,672,921 B1 | 1/2004 | Liang et al. |
| 6,753,999 B2 | 6/2004 | Zehner et al. |
| 6,788,449 B2 | 9/2004 | Liang et al. |
| 6,825,970 B2 | 11/2004 | Goenaga et al. |
| 6,866,760 B2 | 3/2005 | Paolini, Jr. et al. |
| 6,870,657 B1 | 3/2005 | Fitzmaurice et al. |
| 6,900,851 B2 | 5/2005 | Morrison et al. |
| 6,922,276 B2 | 7/2005 | Zhang et al. |
| 6,928,187 B2 | 8/2005 | Cooper et al. |
| 6,950,220 B2 | 9/2005 | Abramson et al. |
| 6,982,178 B2 | 1/2006 | LeCain et al. |
| 6,995,550 B2 | 2/2006 | Jacobson et al. |
| 7,002,728 B2 | 2/2006 | Pullen et al. |
| 7,012,600 B2 | 3/2006 | Zehner et al. |
| 7,023,420 B2 | 4/2006 | Comiskey et al. |
| 7,034,783 B2 | 4/2006 | Gates et al. |
| 7,061,166 B2 | 6/2006 | Kuniyasu |
| 7,061,662 B2 | 6/2006 | Chung et al. |
| 7,072,095 B2 | 7/2006 | Liang et al. |
| 7,075,502 B1 | 7/2006 | Drzaic et al. |
| 7,116,318 B2 | 10/2006 | Amundson et al. |
| 7,116,466 B2 | 10/2006 | Whitesides et al. |
| 7,119,772 B2 | 10/2006 | Amundson et al. |
| 7,144,942 B2 | 12/2006 | Zang et al. |
| 7,170,670 B2 | 1/2007 | Webber |
| 7,177,066 B2 | 2/2007 | Chung et al. |
| 7,193,625 B2 | 3/2007 | Danner et al. |
| 7,202,847 B2 | 4/2007 | Gates |
| 7,236,291 B2 | 6/2007 | Kaga et al. |
| 7,259,744 B2 | 8/2007 | Arango et al. |
| 7,312,784 B2 | 12/2007 | Baucom et al. |
| 7,321,459 B2 | 1/2008 | Masuda et al. |
| 7,327,511 B2 | 2/2008 | Whitesides et al. |
| 7,408,699 B2 | 8/2008 | Wang et al. |
| 7,411,719 B2 | 8/2008 | Paolini, Jr. et al. |
| 7,420,549 B2 | 9/2008 | Jacobson et al. |
| 7,453,445 B2 | 11/2008 | Amundson |
| 7,492,339 B2 | 2/2009 | Amundson |
| 7,528,822 B2 | 5/2009 | Amundson et al. |
| 7,535,624 B2 | 5/2009 | Amundson et al. |
| 7,583,251 B2 | 9/2009 | Arango et al. |
| 7,602,374 B2 | 10/2009 | Zehner et al. |
| 7,612,760 B2 | 11/2009 | Kawai |
| 7,679,599 B2 | 3/2010 | Kawai |
| 7,679,813 B2 | 3/2010 | Liang et al. |
| 7,679,814 B2 | 3/2010 | Paolini, Jr. et al. |
| 7,683,606 B2 | 3/2010 | Kang et al. |
| 7,715,088 B2 | 5/2010 | Liang et al. |
| 7,830,550 B2 | 11/2010 | Jang |
| 7,839,564 B2 | 11/2010 | Whitesides et al. |
| 7,859,742 B1 | 12/2010 | Chiu et al. |
| 7,952,557 B2 | 5/2011 | Amundson |
| 7,956,841 B2 | 6/2011 | Albert et al. |
| 7,982,479 B2 | 7/2011 | Wang et al. |
| 7,999,787 B2 | 8/2011 | Amundson et al. |
| 8,009,348 B2 | 8/2011 | Zehner et al. |
| 8,077,141 B2 | 12/2011 | Duthaler et al. |
| 8,125,501 B2 | 2/2012 | Amundson et al. |
| 8,139,050 B2 | 3/2012 | Jacobson et al. |
| 8,174,490 B2 | 5/2012 | Whitesides et al. |
| 8,243,013 B1 | 8/2012 | Sprague et al. |
| 8,274,472 B1 | 9/2012 | Wang et al. |
| 8,289,250 B2 | 10/2012 | Zehner et al. |
| 8,300,006 B2 | 10/2012 | Zhou et al. |
| 8,314,784 B2 | 11/2012 | Ohkami et al. |
| 8,373,649 B2 | 2/2013 | Low et al. |
| 8,384,658 B2 | 2/2013 | Albert et al. |
| 8,456,414 B2 | 6/2013 | Lin et al. |
| 8,462,102 B2 | 6/2013 | Wong et al. |
| 8,514,168 B2 | 8/2013 | Chung et al. |
| 8,537,105 B2 | 9/2013 | Chiu et al. |
| 8,547,394 B2 | 10/2013 | Swic et al. |
| 8,558,783 B2 | 10/2013 | Wilcox et al. |
| 8,558,786 B2 | 10/2013 | Lin |
| 8,558,855 B2 | 10/2013 | Sprague et al. |
| 8,570,396 B2 | 10/2013 | Rapaport |
| 8,576,164 B2 | 11/2013 | Sprague et al. |
| 8,576,259 B2 | 11/2013 | Lin et al. |
| 8,605,032 B2 | 12/2013 | Liu et al. |
| 8,665,206 B2 | 3/2014 | Lin et al. |
| 8,681,191 B2 | 3/2014 | Yang et al. |
| 8,810,525 B2 | 8/2014 | Sprague |
| 8,928,562 B2 | 1/2015 | Gates et al. |
| 8,928,641 B2 | 1/2015 | Chiu et al. |
| 8,976,444 B2 | 3/2015 | Zhang et al. |
| 9,013,394 B2 | 4/2015 | Lin |
| 9,019,197 B2 | 4/2015 | Lin |
| 9,019,198 B2 | 4/2015 | Lin et al. |
| 9,019,318 B2 | 4/2015 | Sprague et al. |
| 9,082,352 B2 | 7/2015 | Cheng et al. |
| 9,218,773 B2 | 12/2015 | Sun et al. |
| 9,224,338 B2 | 12/2015 | Chan et al. |
| 9,224,342 B2 | 12/2015 | Sprague et al. |
| 9,224,344 B2 | 12/2015 | Chung et al. |
| 9,230,492 B2 | 1/2016 | Harrington et al. |
| 9,251,736 B2 | 2/2016 | Lin et al. |
| 9,262,973 B2 | 2/2016 | Wu et al. |
| 9,279,906 B2 | 3/2016 | Kang |
| 9,299,294 B2 | 3/2016 | Lin et al. |
| 9,373,289 B2 | 6/2016 | Sprague et al. |
| 9,390,066 B2 | 7/2016 | Smith et al. |
| 9,390,661 B2 | 7/2016 | Chiu et al. |
| 9,460,666 B2 | 10/2016 | Sprague et al. |
| 9,495,918 B2 | 11/2016 | Harrington et al. |
| 9,501,981 B2 | 11/2016 | Lin et al. |
| 9,513,743 B2 | 12/2016 | Sjodin et al. |
| 9,514,667 B2 | 12/2016 | Lin |
| 9,612,502 B2 | 4/2017 | Danner et al. |
| 9,620,048 B2 | 4/2017 | Sim et al. |
| 9,672,766 B2 | 6/2017 | Sjodin |
| 9,691,333 B2 | 6/2017 | Cheng et al. |
| 9,721,495 B2 | 8/2017 | Harrington et al. |
| 9,736,335 B2 | 8/2017 | Tourapis et al. |
| 9,792,861 B2 | 10/2017 | Chang et al. |
| 9,792,862 B2 | 10/2017 | Hung et al. |
| 9,832,388 B2 | 11/2017 | Motta et al. |
| 9,966,018 B2 | 5/2018 | Gates et al. |
| 10,229,641 B2 | 3/2019 | Yang et al. |
| 10,242,646 B2 | 3/2019 | Yang |
| 10,319,313 B2 | 6/2019 | Harris et al. |
| 10,339,876 B2 | 7/2019 | Lin et al. |
| 10,444,553 B2 | 10/2019 | Laxton |
| 10,672,350 B2 | 6/2020 | Amundson et al. |
| 2004/0246562 A1 | 12/2004 | Chung et al. |
| 2005/0253777 A1 | 11/2005 | Zehner et al. |
| 2007/0103427 A1 | 5/2007 | Zhou et al. |
| 2007/0176912 A1 | 8/2007 | Beames et al. |
| 2008/0024429 A1 | 1/2008 | Zehner |
| 2008/0136774 A1 | 6/2008 | Harris et al. |
| 2008/0259402 A1* | 10/2008 | Yen .............. H04N 1/6027 358/3.27 |
| 2008/0303780 A1 | 12/2008 | Sprague et al. |
| 2010/0194789 A1 | 8/2010 | Lin et al. |
| 2010/0265561 A1 | 10/2010 | Gates et al. |
| 2011/0063314 A1 | 3/2011 | Chiu et al. |
| 2011/0090381 A1* | 4/2011 | Cote .............. G06T 3/4015 348/246 |
| 2011/0175875 A1 | 7/2011 | Lin et al. |
| 2011/0221740 A1 | 9/2011 | Yang et al. |

(56) References Cited

U.S. PATENT DOCUMENTS

| | | | |
|---|---|---|---|
| 2011/0285713 A1* | 11/2011 | Swic | H04N 9/68 |
| | | | 345/428 |
| 2011/0285714 A1* | 11/2011 | Swic | H04N 9/0451 |
| | | | 345/428 |
| 2011/0285746 A1* | 11/2011 | Swic | H04N 9/77 |
| | | | 345/589 |
| 2012/0098740 A1 | 4/2012 | Chiu et al. | |
| 2013/0063333 A1 | 3/2013 | Arango et al. | |
| 2013/0249782 A1 | 9/2013 | Wu et al. | |
| 2014/0204012 A1 | 7/2014 | Wu et al. | |
| 2014/0240210 A1 | 8/2014 | Wu et al. | |
| 2014/0253425 A1 | 9/2014 | Zalesky et al. | |
| 2014/0293398 A1 | 10/2014 | Wang et al. | |
| 2015/0005720 A1 | 1/2015 | Zang et al. | |
| 2015/0262255 A1 | 9/2015 | Khajehnouri et al. | |
| 2016/0012710 A1 | 1/2016 | Lu et al. | |
| 2016/0180777 A1 | 6/2016 | Lin et al. | |
| 2017/0061677 A1 | 3/2017 | Ryu | |
| 2017/0188000 A1* | 6/2017 | Rosewarne | H04N 19/85 |

OTHER PUBLICATIONS

Wood, D., "An Electrochromic Renaissance?" Information Display, 18(3), 24 (Mar. 2002).

Bach, Udo. et al., "Nanomaterials-Based Electrochromics for Paper-Quality Displays", Adv. Mater, vol. 14, No. 11, pp. 845-848, (Jun. 5, 2002).

Hayes, R.A. et al., "Video-Speed Electronic Paper Based on Electrowetting", Nature, vol. 425, No. 25, pp. 383-385 (Sep. 2003).

Kitamura, T. et al., "Electrical toner movement for electronic paper-like display", Asia Display/IDW '01, pp. 1517-1520, Paper HCS1-1 (2001).

Yamaguchi, Y. et al., "Toner display using insulative particles charged triboelectrically", Asia Display/IDW '01, pp. 1729-1730, Paper AMD4-4 (2001).

Korean Intellectual Property Office, "International Search Report and Written Opinion", PCT/US2021/062131, dated Mar. 22, 2022.

* cited by examiner

METHODS FOR DRIVING ELECTRO-OPTIC DISPLAYS

REFERENCE TO RELATED APPLICATIONS

This application is related to and claims priority to U.S. Provisional Application 63/122,936 filed on Dec. 8, 2020.

The entire disclosures of the aforementioned application is herein incorporated by reference.

SUBJECT OF THE INVENTION

This invention relates to methods for driving electro-optic displays. More specifically, this invention relates to driving methods for rendering images on electro-optic displays with color filters or color filter arrays.

BACKGROUND

Electro-optic displays typically have a backplane provided with a plurality of pixel electrodes each of which defines one pixel of the display; conventionally, a single common electrode extending over a large number of pixels, and normally the whole display is provided on the opposed side of the electro-optic medium. The individual pixel electrodes may be driven directly (i.e., a separate conductor may be provided to each pixel electrode) or the pixel electrodes may be driven in an active matrix manner which will be familiar to those skilled in backplane technology. One way to achieve color in electro-optic displays is to equip such displays with a color filter array (CFA).

However, CFA based displays, including both emissive and reflective displays, suffer from loss of color spatial resolution due to subpixels. Typical CFA displays have red, green, and blue filters. Therefore, if one of the primary colors is shown on a display, it has only one third or less (less because there is filling between subpixels) of the display area to be utilized. Where one pixel in a source image corresponds to one pixel in a display where each pixel location has one of the color filters. In a simple rendering process, if a given pixel location has a red filter, only red channel value will be taken from the same pixel in the source image. The same goes for green and blue filters. This can sometimes lead to a loss of color fine details such as colored fine texts. And this issue can become more severe when a display's color gamut is small, dynamic range is low, or display resolution is low.

As such, driving methods that preserves color fine details in CFA displays are needed.

SUMMARY OF INVENTION

Accordingly, in one aspect, the subject matter presented herein provides for a method for driving an electro-optic display having a plurality of display pixels, the method can include receiving an image, converting the image into a YCbCr image, and processing the YCbCr image to generate a luma image.

In some embodiments, the step of processing the YCbCr image to generate a luma image may further include boosting outputs from a red channel, a green channel, and a blue channel. And boosting the outputs from the red channel, the green channel, and the blue channel may include matching the luma to that of a target pixel.

In some other embodiments, the method may further include calculating variations in a local area for the YCbCr image to obtain a variation map, where calculating the variations may include calculating the variations for each of the red channel, green channel, and the blue channel of the YCbCr image, and calculating the variations comprises maximizing variations for each of the red channel, green channel, and the blue channel of the YCbCr image.

In some embodiments, the method may further include calculating an effect ratio map using the calculated variation, where calculating an effect ratio map may include taking pixel values from the luma image.

In some other embodiments, calculating an effect ratio map may include taking pixel values from the received image.

In yet another embodiment, an electro-optic display configured to carry out the method may include a color filter array. In some embodiments, the display may further include an electrophoretic material comprising a plurality of electrically charged particles disposed in a fluid and capable of moving through the fluid under the influence of an electric field. In some other embodiments, the electrically charged particles and the fluid are confined within a plurality of capsules or microcells. In yet another embodiment, the electrically charged particles and the fluid are present as a plurality of discrete droplets surrounded by a continuous phase may include a polymeric material.

DETAILED DESCRIPTION

Figure 1:
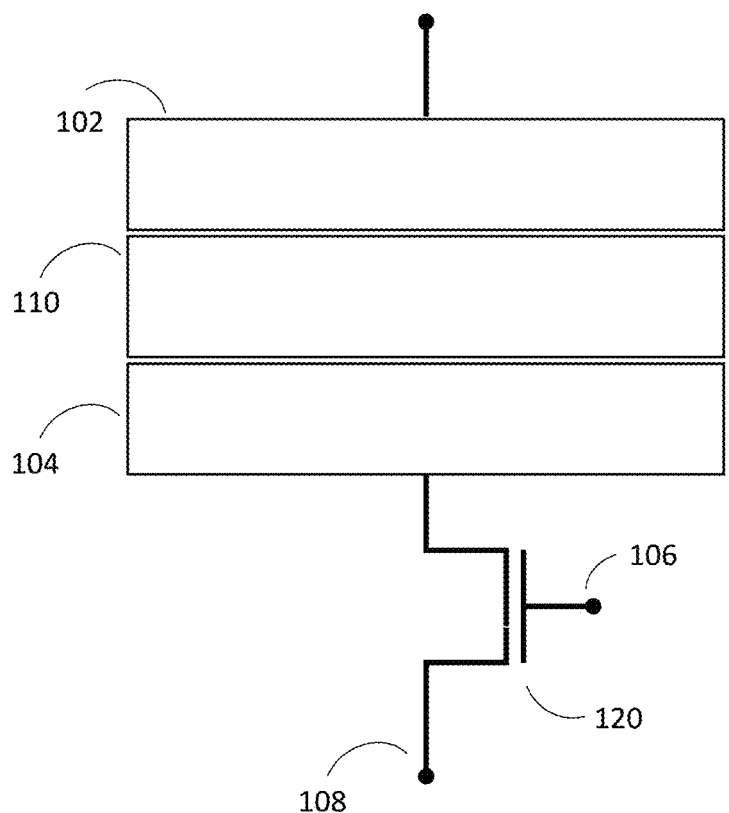
FIG. 1 is a circuit diagram representing an electrophoretic display.

The present invention relates to methods for driving electro-optic displays, especially bistable electro-optic displays, and to apparatus for use in such methods. More specifically, this invention relates to driving methods which may allow for reduced "ghosting" and edge effects, and reduced flashing in such displays. This invention is especially, but not exclusively, intended for use with particle-based electrophoretic displays in which one or more types of electrically charged particles are present in a fluid and are moved through the fluid under the influence of an electric field to change the appearance of the display.

The term "electro-optic", as applied to a material or a display, is used herein in its conventional meaning in the imaging art to refer to a material having first and second display states differing in at least one optical property, the material being changed from its first to its second display state by application of an electric field to the material. Although the optical property is typically color perceptible to the human eye, it may be another optical property, such as optical transmission, reflectance, luminescence or, in the case of displays intended for machine reading, pseudo-color in the sense of a change in reflectance of electromagnetic wavelengths outside the visible range.

The term "gray state" is used herein in its conventional meaning in the imaging art to refer to a state intermediate two extreme optical states of a pixel, and does not necessarily imply a black-white transition between these two extreme states. For example, several of the E Ink patents and published applications referred to below describe electrophoretic displays in which the extreme states are white and deep blue, so that an intermediate "gray state" would actually be pale blue. Indeed, as already mentioned, the change in optical state may not be a color change at all. The terms "black" and "white" may be used hereinafter to refer to the two extreme optical states of a display, and should be understood as normally including extreme optical states which are not strictly black and white, for example, the aforementioned white and dark blue states. The term "monochrome" may be used hereinafter to denote a drive scheme which only drives pixels to their two extreme optical states with no intervening gray states.

Some electro-optic materials are solid in the sense that the materials have solid external surfaces, although the materials may, and often do, have internal liquid- or gas-filled spaces. Such displays using solid electro-optic materials may hereinafter for convenience be referred to as "solid electro-optic displays". Thus, the term "solid electro-optic displays" includes rotating bichromal member displays, encapsulated electrophoretic displays, microcell electrophoretic displays and encapsulated liquid crystal displays.

The terms "bistable" and "bistability" are used herein in their conventional meaning in the art to refer to displays comprising display elements having first and second display states differing in at least one optical property, and such that after any given element has been driven, by means of an addressing pulse of finite duration, to assume either its first or second display state, after the addressing pulse has terminated, that state will persist for at least several times, for example at least four times, the minimum duration of the addressing pulse required to change the state of the display element. It is shown in U.S. Pat. No. 7,170,670 that some particle-based electrophoretic displays capable of gray scale are stable not only in their extreme black and white states but also in their intermediate gray states, and the same is true of some other types of electro-optic displays. This type of display is properly called "multi-stable" rather than bistable, although for convenience the term "bistable" may be used herein to cover both bistable and multi-stable displays.

The term "impulse" is used herein in its conventional meaning of the integral of voltage with respect to time. However, some bistable electro-optic media act as charge transducers, and with such media an alternative definition of impulse, namely the integral of current over time (which is equal to the total charge applied) may be used. The appropriate definition of impulse should be used, depending on whether the medium acts as a voltage-time impulse transducer or a charge impulse transducer.

Much of the discussion below will focus on methods for driving one or more pixels of an electro-optic display through a transition from an initial gray level to a final gray level (which may or may not be different from the initial gray level). The term "waveform" will be used to denote the entire voltage against time curve used to effect the transition from one specific initial gray level to a specific final gray level. Typically such a waveform will comprise a plurality of waveform elements; where these elements are essentially rectangular (i.e., where a given element comprises application of a constant voltage for a period of time); the elements may be called "pulses" or "drive pulses". The term "drive scheme" denotes a set of waveforms sufficient to effect all possible transitions between gray levels for a specific display. A display may make use of more than one drive scheme; for example, the aforementioned U.S. Pat. No. 7,012,600 teaches that a drive scheme may need to be modified depending upon parameters such as the temperature of the display or the time for which it has been in operation during its lifetime, and thus a display may be provided with a plurality of different drive schemes to be used at differing temperature etc. A set of drive schemes used in this manner may be referred to as "a set of related drive schemes." It is also possible, as described in several of the aforementioned MEDEOD applications, to use more than one drive scheme simultaneously in different areas of the same display, and a set of drive schemes used in this manner may be referred to as "a set of simultaneous drive schemes."

Several types of electro-optic displays are known. One type of electro-optic display is a rotating bichromal member type as described, for example, in U.S. Pat. Nos. 5,808,783; 5,777,782; 5,760,761; 6,054,071 6,055,091; 6,097,531; 6,128,124; 6,137,467; and 6,147,791 (although this type of display is often referred to as a "rotating bichromal ball" display, the term "rotating bichromal member" is preferred as more accurate since in some of the patents mentioned above the rotating members are not spherical). Such a display uses a large number of small bodies (typically spherical or cylindrical) which have two or more sections with differing optical characteristics, and an internal dipole. These bodies are suspended within liquid-filled vacuoles within a matrix, the vacuoles being filled with liquid so that the bodies are free to rotate. The appearance of the display is changed by applying an electric field thereto, thus rotating the bodies to various positions and varying which of the sections of the bodies is seen through a viewing surface. This type of electro-optic medium is typically bistable.

Another type of electro-optic display uses an electrochromic medium, for example an electrochromic medium in the form of a nanochromic film comprising an electrode formed at least in part from a semi-conducting metal oxide and a plurality of dye molecules capable of reversible color change attached to the electrode; see, for example O'Regan, B., et al., Nature 1991, 353, 737; and Wood, D., Information Display, 18(3), 24 (March 2002). See also Bach, U., et al., Adv. Mater., 2002, 14(11), 845. Nanochromic films of this type are also described, for example, in U.S. Pat. Nos. 6,301,038; 6,870,657; and 6,950,220. This type of medium is also typically bistable.

Another type of electro-optic display is an electro-wetting display developed by Philips and described in Hayes, R. A., et al., "Video-Speed Electronic Paper Based on Electrowetting", Nature, 425, 383-385 (2003). It is shown in U.S. Pat. No. 7,420,549 that such electro-wetting displays can be made bistable.

One type of electro-optic display, which has been the subject of intense research and development for a number of years, is the particle-based electrophoretic display, in which a plurality of charged particles move through a fluid under the influence of an electric field. Electrophoretic displays can have attributes of good brightness and contrast, wide viewing angles, state bistability, and low power consumption when compared with liquid crystal displays. Nevertheless, problems with the long-term image quality of these displays have prevented their widespread usage. For example, particles that make up electrophoretic displays tend to settle, resulting in inadequate service-life for these displays.

As noted above, electrophoretic media require the presence of a fluid. In most prior art electrophoretic media, this fluid is a liquid, but electrophoretic media can be produced using gaseous fluids; see, for example, Kitamura, T., et al., "Electrical toner movement for electronic paper-like display", IDW Japan, 2001, Paper HCS1-1, and Yamaguchi, Y., et al., "Toner display using insulative particles charged triboelectrically", IDW Japan, 2001, Paper AMD4-4). See also U.S. Pat. Nos. 7,321,459 and 7,236,291. Such gas-based electrophoretic media appear to be susceptible to the same types of problems due to particle settling as liquid-based electrophoretic media, when the media are used in an orientation which permits such settling, for example in a sign where the medium is disposed in a vertical plane. Indeed, particle settling appears to be a more serious problem in gas-based electrophoretic media than in liquid-based ones, since the lower viscosity of gaseous suspending fluids as compared with liquid ones allows more rapid settling of the electrophoretic particles.

Numerous patents and applications assigned to or in the names of the Massachusetts Institute of Technology (MIT) and E Ink Corporation describe various technologies used in encapsulated electrophoretic and other electro-optic media. Such encapsulated media comprise numerous small capsules, each of which itself comprises an internal phase containing electrophoretically-mobile particles in a fluid medium, and a capsule wall surrounding the internal phase. Typically, the capsules are themselves held within a polymeric binder to form a coherent layer positioned between two electrodes. The technologies described in these patents and applications include:

(a) Electrophoretic particles, fluids and fluid additives; see for example U.S. Pat. Nos. 7,002,728 and 7,679,814;

(b) Capsules, binders and encapsulation processes; see for example U.S. Pat. Nos. 6,922,276 and 7,411,719;

(c) Microcell structures, wall materials, and methods of forming microcells; see for example U.S. Pat. Nos. 7,072,095 and 9,279,906;

(d) Methods for filling and sealing microcells; see for example U.S. Pat. Nos. 7,144,942 and 7,715,088;

(e) Films and sub-assemblies containing electro-optic materials; see for example U.S. Pat. Nos. 6,982,178 and 7,839,564;

(f) Backplanes, adhesive layers and other auxiliary layers and methods used in displays; see for example U.S. Pat. Nos. 7,116,318 and 7,535,624;

(g) Color formation and color adjustment; see for example U.S. Pat. Nos. 7,075,502 and 7,839,564.

(h) Applications of displays; see for example U.S. Pat. Nos. 7,312,784; 8,009,348;

(i) Non-electrophoretic displays, as described in U.S. Pat. No. 6,241,921 and U.S. Patent Application Publication No. 2015/0277160; and applications of encapsulation and microcell technology other than displays; see for example U.S. Patent Application Publications Nos. 2015/0005720 and 2016/0012710; and (j) Methods for driving displays; see for example U.S. Pat. Nos. 5,930,026; 6,445,489; 6,504,524; 6,512,354; 6,531,997; 6,753,999; 6,825,970; 6,900,851; 6,995,550; 7,012,600; 7,023,420; 7,034,783; 7,061,166; 7,061,662; 7,116,466; 7,119,772; 7,177,066; 7,193,625; 7,202,847; 7,242,514; 7,259,744; 7,304,787; 7,312,794; 7,327,511; 7,408,699; 7,453,445; 7,492,339; 7,528,822; 7,545,358; 7,583,251; 7,602,374; 7,612,760; 7,679,769; 7,679,813; 7,683,606; 7,688,297; 7,729,039; 7,733,311; 7,733,335; 7,787,169; 7,859,742; 7,952,557; 7,956,841; 7,982,479; 7,999,787; 8,077,141; 8,125,501; 8,139,050; 8,174,490; 8,243,013; 8,274,472; 8,289,250; 8,300,006; 8,305,341; 8,314,784; 8,373,649; 8,384,658; 8,456,414; 8,462,102; 8,537,105; 8,558,783; 8,558,785; 8,558,786; 8,558,855; 8,576,164; 8,576,259; 8,593,396; 8,605,032; 8,643,595; 8,665,206; 8,681,191; 8,730,153; 8,810,525; 8,928,562; 8,928,641; 8,976,444; 9,013,394; 9,019,197; 9,019,198; 9,019,318; 9,082,352; 9,171,508; 9,218,773; 9,224,338; 9,224,342; 9,224,344; 9,230,492; 9,251,736; 9,262,973; 9,269,311; 9,299,294; 9,373,289; 9,390,066; 9,390,661; and 9,412,314; and U.S. Patent Applications Publication Nos. 2003/0102858; 2004/0246562; 2005/0253777; 2007/0070032; 2007/0076289; 2007/0091418; 2007/0103427; 2007/0176912; 2007/0296452; 2008/0024429; 2008/0024482; 2008/0136774; 2008/0169821; 2008/0218471; 2008/0291129; 2008/0303780; 2009/0174651; 2009/0195568; 2009/0322721; 2010/0194733; 2010/0194789; 2010/0220121; 2010/0265561; 2010/0283804; 2011/0063314; 2011/0175875; 2011/0193840; 2011/0193841; 2011/0199671; 2011/0221740; 2012/0001957; 2012/0098740; 2013/0063333; 2013/0194250; 2013/0249782; 2013/0321278; 2014/0009817; 2014/0085355; 2014/0204012; 2014/0218277; 2014/0240210; 2014/0240373; 2014/0253425; 2014/0292830; 2014/0293398; 2014/0333685; 2014/0340734; 2015/0070744; 2015/0097877; 2015/0109283; 2015/0213749; 2015/0213765; 2015/0221257; 2015/0262255; 2016/0071465; 2016/0078820; 2016/0093253; 2016/0140910; and 2016/0180777.

Many of the aforementioned patents and applications recognize that the walls surrounding the discrete microcapsules in an encapsulated electrophoretic medium could be replaced by a continuous phase, thus producing a so-called polymer-dispersed electrophoretic display, in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet; see for example, the aforementioned 2002/0131147. Accordingly, for purposes of the present application, such polymer-dispersed electrophoretic media are regarded as sub-species of encapsulated electrophoretic media.

A related type of electrophoretic display is a so-called "microcell electrophoretic display." In a microcell electrophoretic display, the charged particles and the suspending fluid are not encapsulated within microcapsules but instead are retained within a plurality of cavities formed within a carrier medium, e.g., a polymeric film. See, for example, International Application Publication No. WO 02/01281, and published U.S. Application No. 2002/0075556, both assigned to Sipix Imaging, Inc.

Many of the aforementioned E Ink and MIT patents and applications also contemplate microcell electrophoretic displays and polymer-dispersed electrophoretic displays. The term "encapsulated electrophoretic displays" can refer to all such display types, which may also be described collectively as "microcavity electrophoretic displays" to generalize across the morphology of the walls.

Another type of electro-optic display is an electro-wetting display developed by Philips and described in Hayes, R. A., et al., "Video-Speed Electronic Paper Based on Electrowetting," Nature, 425, 383-385 (2003). It is shown in copending application Ser. No. 10/711,802, filed Oct. 6, 2004, that such electro-wetting displays can be made bistable.

Other types of electro-optic materials may also be used. Of particular interest, bistable ferroelectric liquid crystal displays (FLCs) are known in the art and have exhibited remnant voltage behavior.

Although electrophoretic media may be opaque (since, for example, in many electrophoretic media, the particles substantially block transmission of visible light through the display) and operate in a reflective mode, some electrophoretic displays can be made to operate in a so-called "shutter mode" in which one display state is substantially opaque and one is light-transmissive. See, for example, the patents U.S. Pat. Nos. 6,130,774 and 6,172,798, and U.S. Pat. Nos. 5,872,552; 6,144,361; 6,271,823; 6,225,971; and 6,184,856. Dielectrophoretic displays, which are similar to electrophoretic displays but rely upon variations in electric field strength, can operate in a similar mode; see U.S. Pat. No. 4,418,346. Other types of electro-optic displays may also be capable of operating in shutter mode.

A high-resolution display may include individual pixels which are addressable without interference from adjacent pixels. One way to obtain such pixels is to provide an array of non-linear elements, such as transistors or diodes, with at least one non-linear element associated with each pixel, to produce an "active matrix" display. An addressing or pixel electrode, which addresses one pixel, is connected to an appropriate voltage source through the associated non-linear element. When the non-linear element is a transistor, the pixel electrode may be connected to the drain of the transistor, and this arrangement will be assumed in the following description, although it is essentially arbitrary and the pixel electrode could be connected to the source of the transistor. In high-resolution arrays, the pixels may be arranged in a two-dimensional array of rows and columns, such that any specific pixel is uniquely defined by the intersection of one specified row and one specified column. The sources of all the transistors in each column may be connected to a single column electrode, while the gates of all the transistors in each row may be connected to a single row electrode; again the assignment of sources to rows and gates to columns may be reversed if desired.

The display may be written in a row-by-row manner. The row electrodes are connected to a row driver, which may apply to a selected row electrode a voltage such as to ensure that all the transistors in the selected row are conductive, while applying to all other rows a voltage such as to ensure that all the transistors in these non-selected rows remain non-conductive. The column electrodes are connected to column drivers, which place upon the various column electrodes voltages selected to drive the pixels in a selected row to their desired optical states. (The aforementioned voltages are relative to a common front electrode which may be provided on the opposed side of the electro-optic medium from the non-linear array and extends across the whole display. As in known in the art, voltage is relative and a measure of a charge differential between two points. One voltage value is relative to another voltage value. For example, zero voltage ("OV") refers to having no voltage differential relative to another voltage.) After a pre-selected interval known as the "line address time," a selected row is deselected, another row is selected, and the voltages on the column drivers are changed so that the next line of the display is written.

However, in use, certain waveforms may produce a remnant voltage to pixels of an electro-optic display, and as evident from the discussion above, this remnant voltage produces several unwanted optical effects and is in general undesirable.

As presented herein, a "shift" in the optical state associated with an addressing pulse refers to a situation in which a first application of a particular addressing pulse to an electro-optic display results in a first optical state (e.g., a first gray tone), and a subsequent application of the same addressing pulse to the electro-optic display results in a second optical state (e.g., a second gray tone). Remnant voltages may give rise to shifts in the optical state because the voltage applied to a pixel of the electro-optic display during application of an addressing pulse includes the sum of the remnant voltage and the voltage of the addressing pulse.

A "drift" in the optical state of a display over time refers to a situation in which the optical state of an electro-optic display changes while the display is at rest (e.g., during a period in which an addressing pulse is not applied to the display). Remnant voltages may give rise to drifts in the optical state because the optical state of a pixel may depend on the pixel's remnant voltage, and a pixel's remnant voltage may decay over time.

As discussed above, "ghosting" refers to a situation in which, after the electro-optic display has been rewritten, traces of the previous image(s) are still visible. Remnant voltages may give rise to "edge ghosting," a type of ghosting in which an outline (edge) of a portion of a previous image remains visible.

An Exemplary EPD

FIG. 1 shows a schematic of a pixel 100 of an electro-optic display in accordance with the subject matter submitted herein. Pixel 100 may include an imaging film 110. In some embodiments, imaging film 110 may be bistable. In some embodiments, imaging film 110 may include, without limitation, an encapsulated electrophoretic imaging film, which may include, for example, charged pigment particles.

Imaging film 110 may be disposed between a front electrode 102 and a rear electrode 104. Front electrode 102 may be formed between the imaging film and the front of the display. In some embodiments, front electrode 102 may be transparent. In some embodiments, front electrode 102 may be formed of any suitable transparent material, including, without limitation, indium tin oxide (ITO). Rear electrode 104 may be formed opposite a front electrode 102. In some embodiments, a parasitic capacitance (not shown) may be formed between front electrode 102 and rear electrode 104.

Pixel 100 may be one of a plurality of pixels. The plurality of pixels may be arranged in a two-dimensional array of rows and columns to form a matrix, such that any specific pixel is uniquely defined by the intersection of one specified row and one specified column. In some embodiments, the matrix of pixels may be an "active matrix," in which each pixel is associated with at least one non-linear circuit element 120. The non-linear circuit element 120 may be coupled between back-plate electrode 104 and an addressing electrode 108. In some embodiments, non-linear element 120 may include a diode and/or a transistor, including, without limitation, a MOSFET. The drain (or source) of the MOSFET may be coupled to back-plate electrode 104, the source (or drain) of the MOSFET may be coupled to addressing electrode 108, and the gate of the MOSFET may be coupled to a driver electrode 106 configured to control the activation and deactivation of the MOSFET. (For simplicity, the terminal of the MOSFET coupled to back-plate electrode 104 will be referred to as the MOSFET's drain, and the terminal of the MOSFET coupled to addressing electrode 108 will be referred to as the MOSFET's source. However, one of ordinary skill in the art will recognize that, in some embodiments, the source and drain of the MOSFET may be interchanged.)

In some embodiments of the active matrix, the addressing electrodes 108 of all the pixels in each column may be connected to a same column electrode, and the driver electrodes 106 of all the pixels in each row may be connected to a same row electrode. The row electrodes may be connected to a row driver, which may select one or more rows of pixels by applying to the selected row electrodes a voltage sufficient to activate the non-linear elements 120 of all the pixels 100 in the selected row(s). The column electrodes may be connected to column drivers, which may place upon the addressing electrode 106 of a selected (activated) pixel a voltage suitable for driving the pixel into a desired optical state. The voltage applied to an addressing electrode 108 may be relative to the voltage applied to the pixel's front-plate electrode 102 (e.g., a voltage of approximately zero volts). In some embodiments, the front-plate electrodes 102 of all the pixels in the active matrix may be coupled to a common electrode.

In some embodiments, the pixels 100 of the active matrix may be written in a row-by-row manner. For example, a row of pixels may be selected by the row driver, and the voltages corresponding to the desired optical states for the row of pixels may be applied to the pixels by the column drivers. After a pre-selected interval known as the "line address time," the selected row may be deselected, another row may be selected, and the voltages on the column drivers may be changed so that another line of the display is written.

Figure 2:
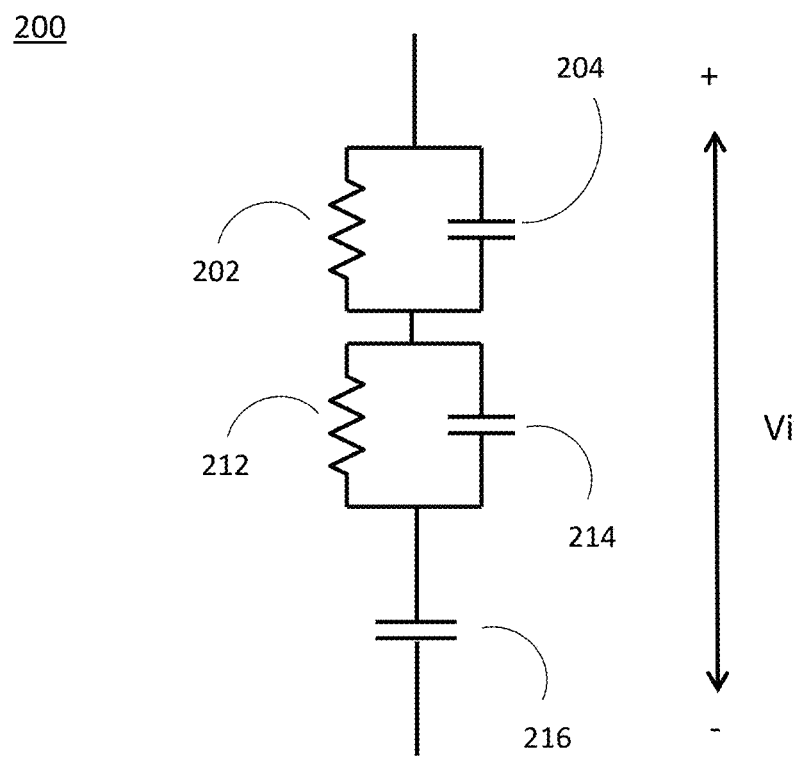
FIG. 2 shows a circuit model of the electro-optic imaging layer.

FIG. 2 shows a circuit model of the electro-optic imaging layer 110 disposed between the front electrode 102 and the rear electrode 104 in accordance with the subject matter presented herein. Resistor 202 and capacitor 204 may represent the resistance and capacitance of the electro-optic imaging layer 110, the front electrode 102 and the rear electrode 104, including any adhesive layers. Resistor 212 and capacitor 214 may represent the resistance and capacitance of a lamination adhesive layer. Capacitor 216 may represent a capacitance that may form between the front electrode 102 and the back electrode 104, for example, interfacial contact areas between layers, such as the interface between the imaging layer and the lamination adhesive layer and/or between the lamination adhesive layer and the backplane electrode. A voltage Vi across a pixel's imaging film 110 may include the pixel's remnant voltage.

In use, it is desirable for an electro-optic display as illustrated in FIGS. 1 and 2 to update to a subsequent image without flashing the display's background. However, the straightforward method of using an empty transition in image updating for a background color to background color (e.g., white-to-white, or black-to-black) waveform may lead to the build-up of edge artifacts (e.g., bloomings). In a black and white electro-optic display, the edge artifacts may be reduced by using specialized waveforms such as a top off waveform. However, in an electro-optic display such as an electrophoretic display (EPD) with colors generated using a color filter array (CFA), maintaining color quality and contrast may be challenging sometimes.

Figure 3:
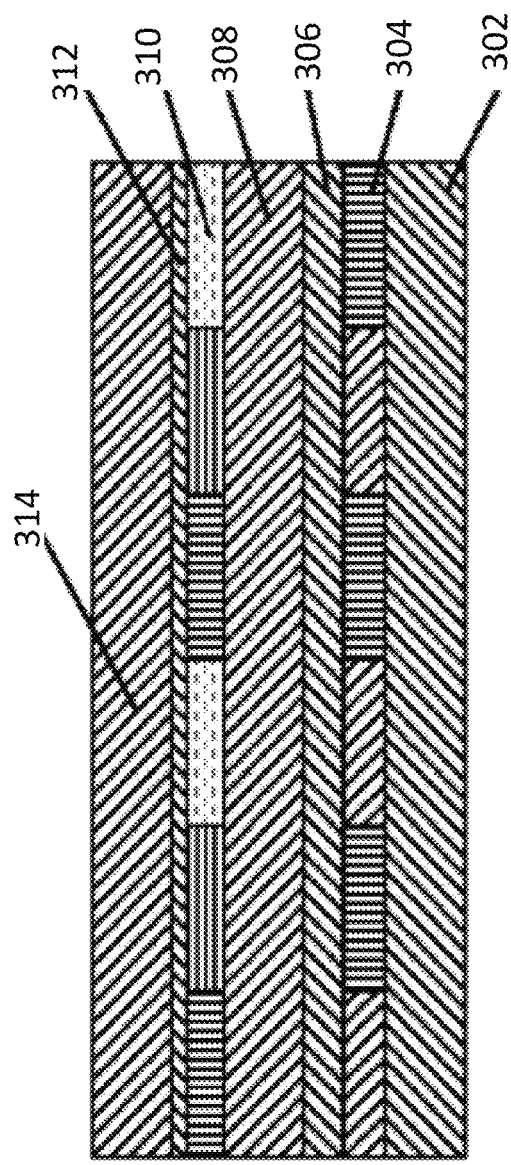
FIG. 3 illustrates a cross sectional view of an electro-optic display having a colored filter array.

FIG. 3 illustrates a cross sectional view of a CFA based colored EPD in accordance with the subject matter disclosed herein. As shown in FIG. 3, a color electrophoretic display (generally designated 300) comprising a backplane 302 bearing a plurality of pixel electrodes 304. To this backplane 302 may be laminated an inverted front plane laminate, this inverted front plane laminate may comprise a monochrome electrophoretic medium layer 306 having black and white extreme optical states, an adhesive layer 308, a color filter array 310 having red, green and blue areas aligned with the pixel electrodes 304, a substantially transparent conductive layer 312 (typically formed from indium-tin-oxide, no) and a front protective layer 314.

Figure 4:
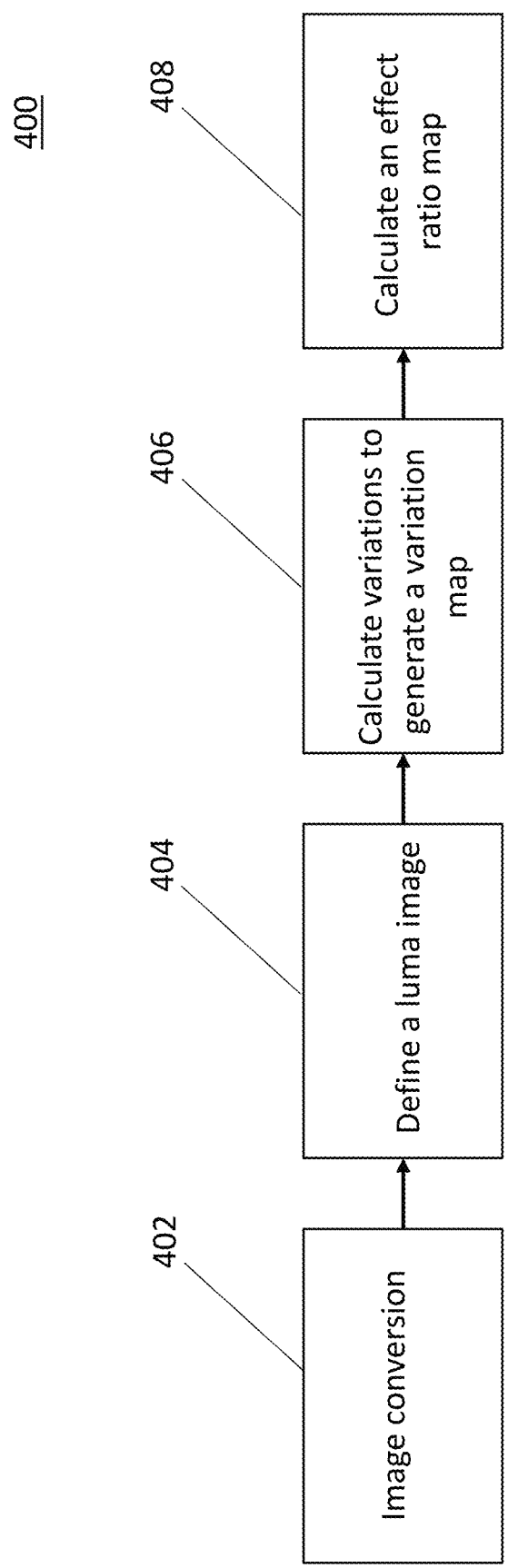
FIG. 4 is a block diagram illustrating a driving method in accordance with the subject matter disclosed herein.

In practice, variations in local areas of an image may be used to preserve fine color details of a CFA display. The subject matter presented herein utilizes Local Variation-based Subpixel rendering, or LVS rendering. A process where the use of color variation in local areas of a given input image, and then determine if this area is a detail preserving area, is adopted to better presented the fine color details. Referring now to FIG. 4, where an exemplary method 400 for driving a CFA display is presented in accordance with the subjected disclosed herein.

In some embodiments, a LVS rendering algorithm may firstly take a source image (e.g., a sRGB image or img_sRGB) and a subpixel location map (e.g., imMASK) that defines which pixel location has which color filter as the input. Subsequently, at step 402 of FIG. 4, the sRGB image may be converted to a YCbCr image using methods commonly adopted in the industry, such as a linear transformation defined in ITU-R Recommendation BT.601.

Figure 6:
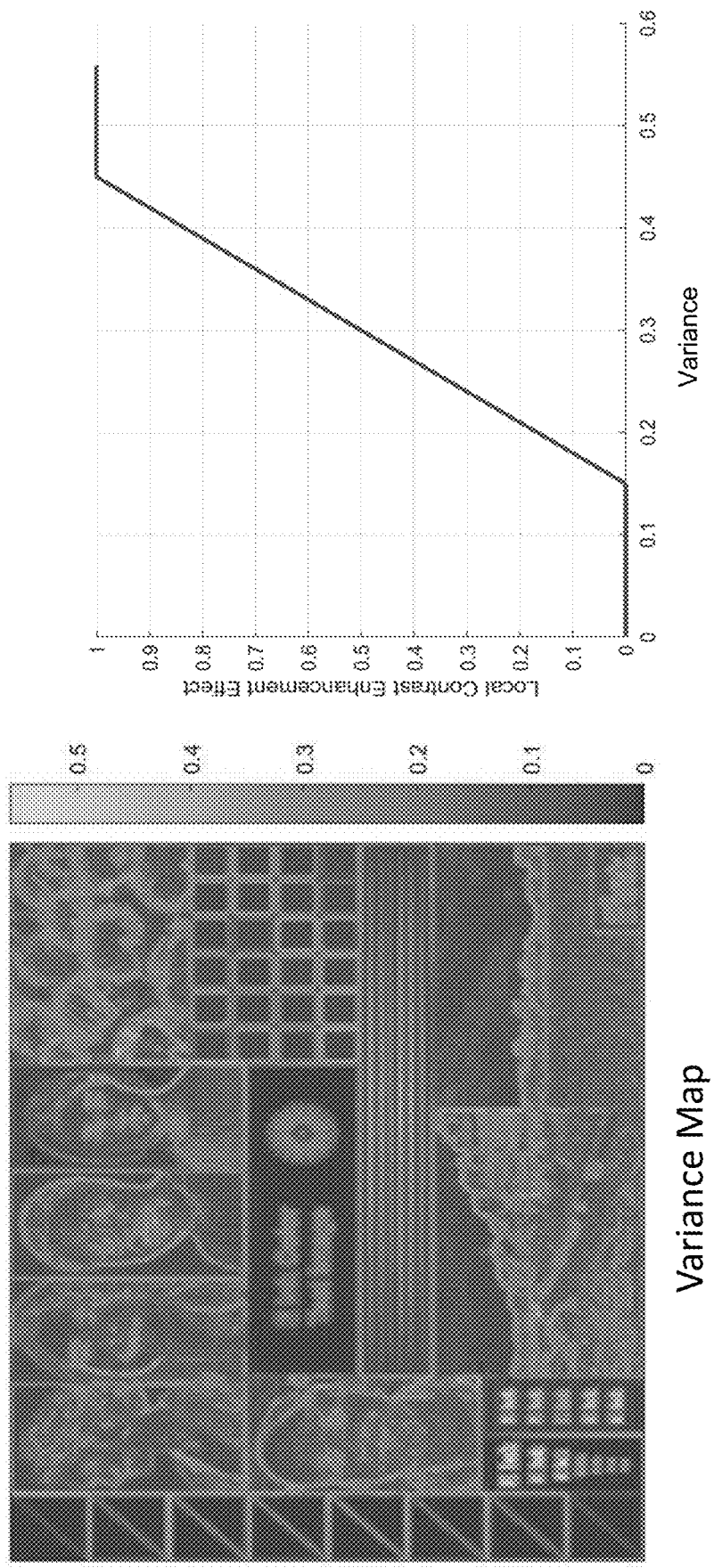
FIG. 6 illustrates a variance map in accordance with the subject matter disclosed herein.

Next, at step 404 of FIG. 4, a luma image (e.g., img_luma) may be defined according to an exemplary algorithm presented below:
for k=1:3
 img_luma(imMASK==k)=img_Y(imMASK==k)
  *c_boost_RGB(k)
end
where img_Y is a Y-channel image from YCbCr image, c_boost_RGB is a list of three coefficients to boost red, green, and blue channel outputs. The boosting may be ideal to match luma of a target pixel since transparency is different among three channels. The coefficients are tunable parameters designed to balance the image brightness. As illustrated in FIG. 6.

Figure 5:
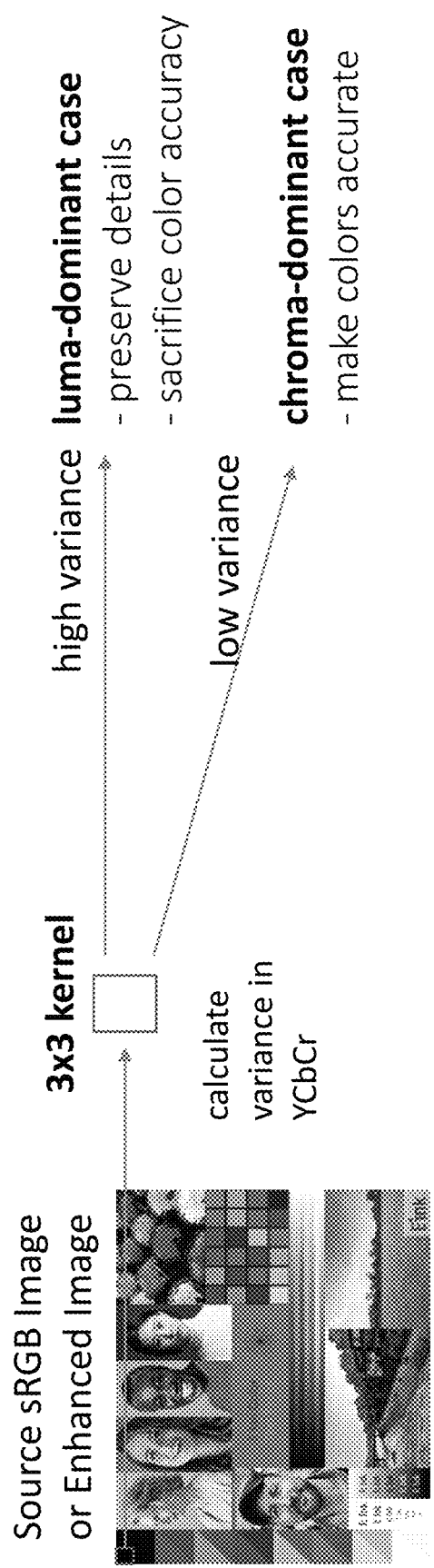
FIG. 5 illustrates an exemplary process flow for rendering a color image for a CFA display.

After the creation of the luma image, in step 406, local variation may be calculated to generate a variation map of the image (See FIG. 6). Calculation of the variation may be done in local areas for each channels in YCbCr. For the purpose of illustration, a local area size of 3×3 pixel area is used herein, for example, as illustrated in FIG. 5. An exemplary algorithm for generating a variation map is illustrated here:
For each channel in YCbCr:
 For each local area:
  calculate mean pixel value,
  For each pixel:
   subtract the mean,
   take absolute value,
   take square-root,
  End
  calculate mean of the square-rooted values of all pixels.
   This is conceptually the
   variation in a local area.
 End
End
For each pixel:
Take maximum variation among three channels
End
In some embodiments, for each channel in YCbCr and for each local area as defined above, one may calculate a mean pixel value by subtract the mean from each pixel, take an absolute value, and then take square-root of that value. Where pixel value may be defined as a value describing how bright a pixel is, and/or what color it should be. In the simplest case of binary images, the pixel value may be a 1-bit number indicating either foreground or background. For grayscale images, a pixel value may be a single number that represents the brightness of the pixel. For example, for a byte image, this number may be stored as an 8-bit integer giving a range of possible values from 0 to 255, where zero is taken to be black, and 255 is taken to be white. Values in between make up the different shades of gray. To represent color images, separate red, green and blue components may be specified for each pixel, and so the pixel value may actually be a vector of three numbers. Often the three different components may be stored as three separate grayscale image known as color planes (one for each of red, green and blue), which have to be recombined when displaying or processing. Subsequently the variation in a local area may be calculated by calculate the mean of the square-root values of all the pixels in the local area.

In alternative embodiments, instead of taking square-root of absolute difference between pixel value and neighboring average, one can also take standard deviation, variance, or any other means to define local variations. Similarly, when pooling variations among three channels together, one can take any form such as mean and median instead of max. The variations could be calculated in three channels together instead of calculating them for each channel.

Figure 7:
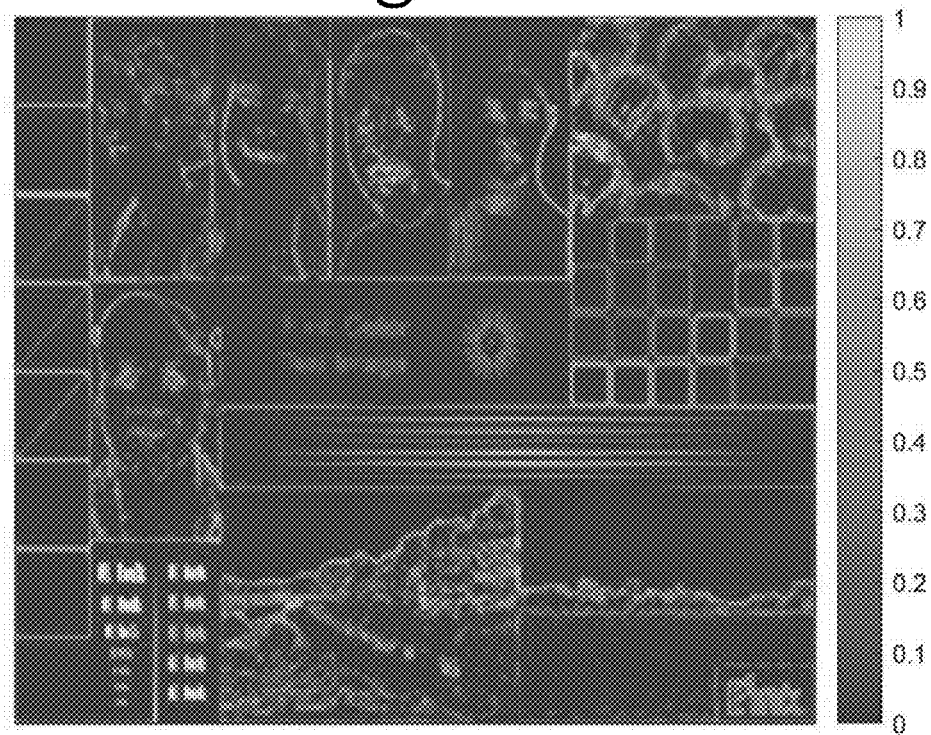
FIG. 7 illustrates an effect ratio map in accordance with the subject matter disclosed herein.

Next, in step 408, an effect ratio map may be generated, as shown in FIG. 7, the effect ratio map configured to define detail preservation effect to each display pixels. The effect ratio for a given pixel is defined in a piece-wise linear function illustrated below:

$$r=(v-k1)/(k2-k1)$$

r=1 if r>1 r=0 if r<0 where r is an effect ratio, v is a variation calculated above, and k1 and k2 are tunable parameters.

If it's full effect (r=1), the pixel value is taken from img_luma at the specified pixel location. If it's no effect (r=0), the pixel value is taken from a corresponding color channel in img_sRGB at the specified pixel location. Pixel values are linearly interpolated if the effect is between 0 and 1.

Note that the effect ratio map can be calculated in any linear or non-linear functions taking variations as input.

It will be apparent to those skilled in the art that numerous changes and modifications can be made to the specific embodiments of the invention described above without departing from the scope of the invention. Accordingly, the whole of the foregoing description is to be interpreted in an illustrative and not in a limitative sense.

The invention claimed is:

1. A method for driving an electro-optic display having a plurality of display pixels, the method comprising:
   receiving an image;
   converting the image into a YCbCr image;
   processing the YCbCr image to generate a luma image;
   calculating variations in a local area for the YCbCr image to obtain a variation map; and
   calculating an effect ratio map using the calculated variation.

2. The method of claim 1, wherein the step of processing the YCbCr image to generate a luma image further comprising boosting outputs from a red channel, a green channel, and a blue channel.

3. The method of claim 2, wherein boosting the outputs from a red channel, a green channel, and a blue channel comprises matching the luma to that of a target pixel.

4. The method of claim 1, wherein calculating the variations comprises calculating the variations for each of the red channel, green channel, and the blue channel of the YCbCr image.

5. The method of claim 4 wherein calculating the variations comprises maximizing variations for each of the red channel, green channel, and the blue channel of the YCbCr image.

6. The method of claim 1, wherein calculating an effect ratio map comprises taking pixel values from the luma image.

7. The method of claim 1, wherein calculating an effect ratio map comprises taking pixel values from the received image.

8. An electro-optic display configured to carry out the method of claim 1 further comprising a color filter array.

9. The electro-optic display according to claim 8 comprising an electrophoretic material comprising a plurality of electrically charged particles disposed in a fluid and capable of moving through the fluid under the influence of an electric field.

10. The electro-optic display according to claim 8 wherein the electrically charged particles and the fluid are confined within a plurality of capsules or microcells.

11. The electro-optic display according to claim 8 wherein the electrically charged particles and the fluid are present as a plurality of discrete droplets surrounded by a continuous phase comprising a polymeric material.

12. A display controller capable of controlling the operation of a bistable electro-optic display, the controller configured to carry out a driving method for operating the display, the method comprises:
   receiving an image;
   converting the image into a YCbCr image;
   processing the YCbCr image to generate a luma image;
   calculating variations in a local area for the YCbCr image to obtain a variation map; and
   calculating an effect ratio map using the calculated variation.

13. The controller according to claim 12, wherein the driving method further comprising calculating an effect ratio map comprises taking pixel values from the luma image.

* * * * *